No. 736,300. PATENTED AUG. 11, 1903.
W. H. SANDIFER & N. E. MEREDITH.
PLANTER ATTACHMENT.
APPLICATION FILED DEC. 10, 1902.

NO MODEL. 2 SHEETS—SHEET 1.

Witnesses
Harry L. Ames
Chas. S. Hyer

Inventors
William H. Sandifer
Noah E. Meredith
By Victor J. Evans
Attorney

No. 736,300. PATENTED AUG. 11, 1903.
W. H. SANDIFER & N. E. MEREDITH.
PLANTER ATTACHMENT.
APPLICATION FILED DEC. 10, 1902.
NO MODEL. 2 SHEETS—SHEET 2.
FIG. 4. FIG. 5.
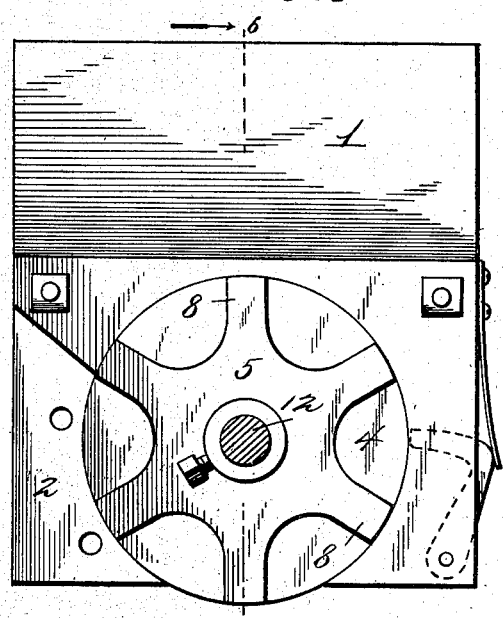
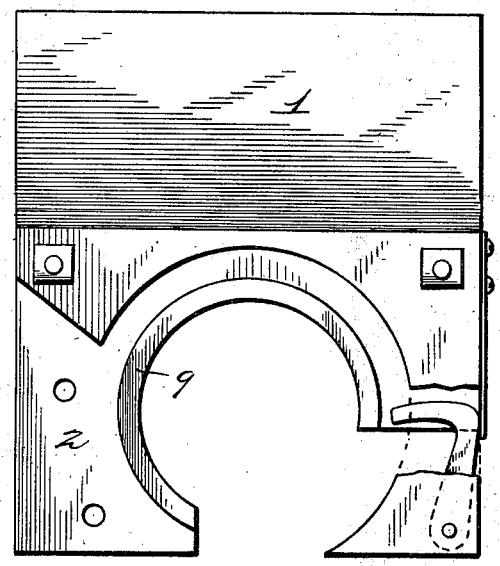
FIG. 6. FIG. 7. FIG. 9.
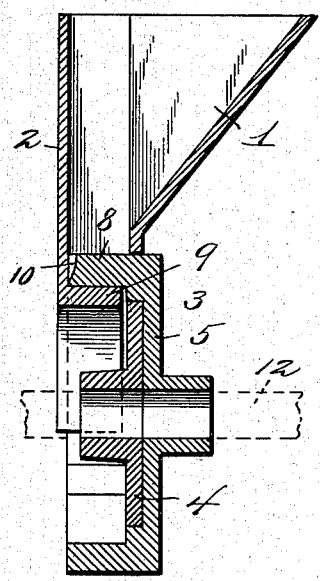
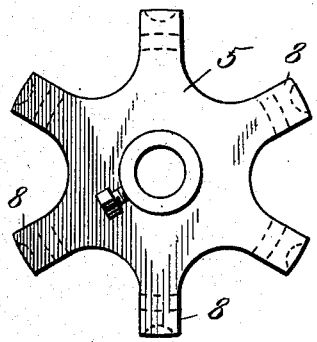
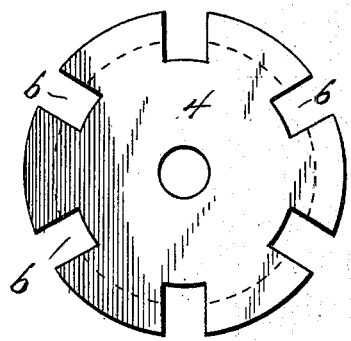
FIG. 8. FIG. 10.
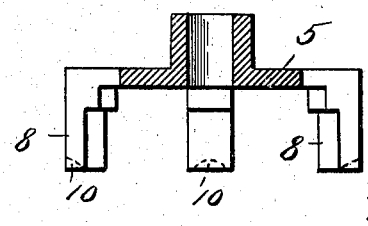
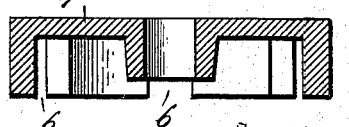
Witnesses
Harry L. Ames.
Chas. S. Hoyer.
Inventors
William H. Sandifer
Noah E. Meredith.
By Victor J. Evans
Attorney.

No. 736,300. Patented August 11, 1903.

UNITED STATES PATENT OFFICE.

WILLIAM H. SANDIFER AND NOAH E. MEREDITH, OF INDIANAPOLIS, INDIANA.

PLANTER ATTACHMENT.

SPECIFICATION forming part of Letters Patent No. 736,300, dated August 11, 1903.

Application filed December 10, 1902. Serial No. 134,685. (No model.)

*To all whom it may concern:*

Be it known that we, WILLIAM H. SANDIFER and NOAH E. MEREDITH, citizens of the United States, residing at Indianapolis, in the county of Marion and State of Indiana, have invented new and useful Improvements in Planter Attachments, of which the following is a specification.

Our invention relates to corn, cotton, or like planting machines, and has for its objects to provide for such machines a simple and efficient seed-feeding wheel, in which the seed-cells may be readily varied in size to accommodate them to different-sized seeds or kernels or to change their capacity for holding one or more kernels at once, as circumstances may require.

A further object of the invention is to provide a simple and efficient mechanism which may be readily operated to change the distance between the hills being planted.

To these ends the invention comprises a seed-hopper, a relatively fixed plate carried thereby, a rotary seed-disk mounted beneath the hopper and abutting against said plate, said disk comprising two relatively adjustable members, one provided in its periphery with transverse grooves constituting seed-cells and the other with tongues seated in said grooves and adapted, upon the adjustment of the members to and from each other, to vary the size of the cells.

The invention further comprises a seed-hopper, an operating-shaft, means operated by the shaft for discharging seed from the hopper, a star-wheel mounted on the operating shaft, a driving-disk mounted adjacent to the star-wheel and provided with teeth which engage the same to operate the shaft, the disk having a plurality of rows of teeth, the teeth of each row being differently spaced from those of the other rows, and means for adjusting the star-wheel along the shaft to bring it into engagement with any desired row of teeth to vary the intervals of discharge, and consequently the distance between the hills being planted.

The invention further consists in the details of construction more fully hereinafter pointed out.

Figure 1:
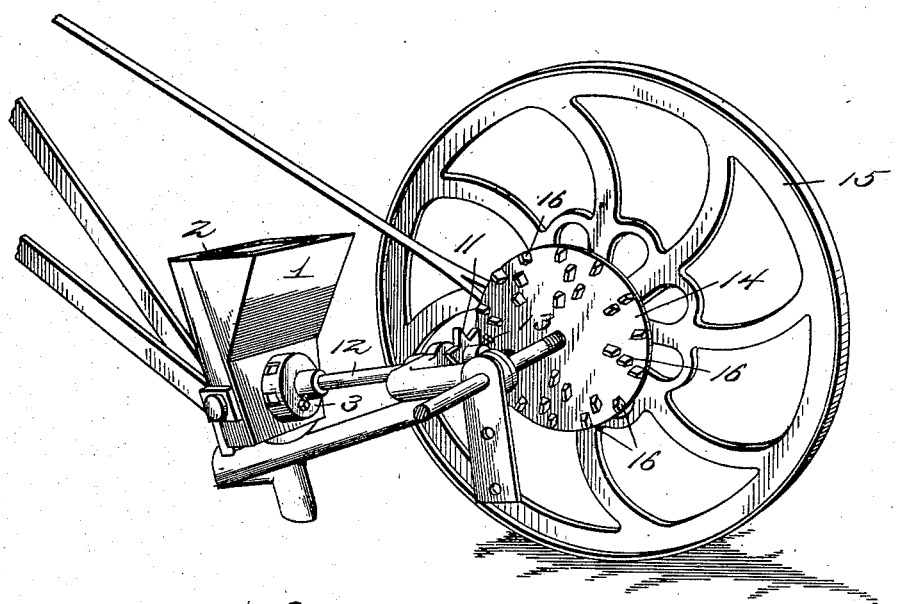
Figure 2:
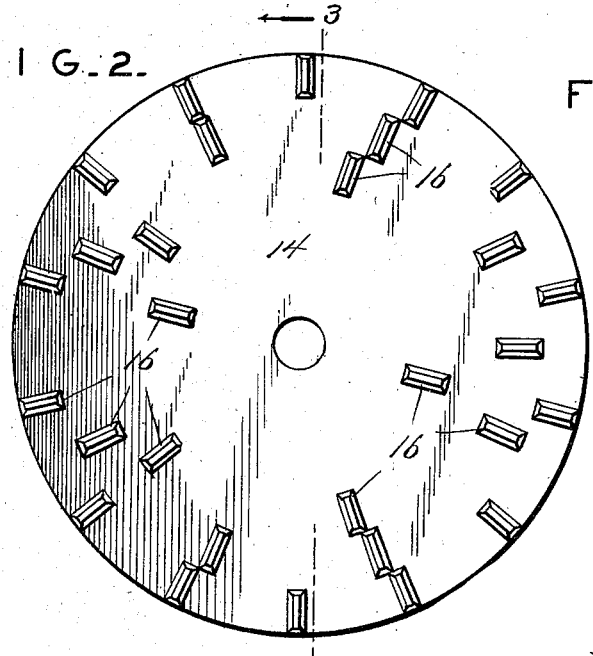
Figure 3:
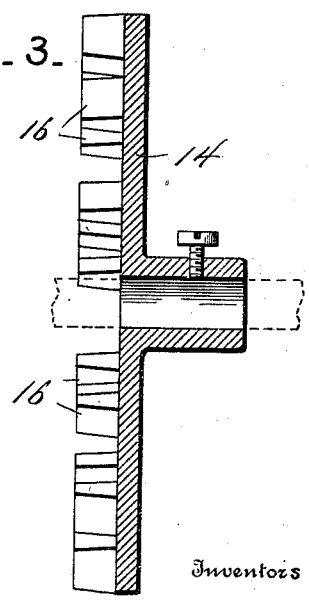

In the accompanying drawings, Figure 1 is a perspective view of a portion of a seed-planter embodying our invention. Fig. 2 is a face view of the driving-disk. Fig. 3 is a vertical section of the same, taken on the line 3 3 of the preceding figure looking in the direction of the arrows. Fig. 4 is a front elevation of the seed-hopper, showing the seed-disk mounted therein. Fig. 5 is a similar view with the seed-disk removed. Fig. 6 is a vertical section through the same on the line 6 6 of Fig. 4. Fig. 7 is a front elevation of one of the members of the seed-disk. Fig. 8 is a transverse section of the same. Fig. 9 is a front elevation of the other member of the seed-disk. Fig. 10 is a transverse section of the same.

Referring to the drawings, 1 indicates a seed-hopper suitably mounted on the framework of the machine and provided with a relatively fixed back plate 2.

3 is a rotary seed-disk mounted beneath the hopper upon an operating-shaft 12 and adapted to abut against the fixed plate 2. This disk comprises two relatively adjustable members 4 and 5, of which the member 4 is preferably fixed and provided with seed-cells consisting of transverse peripheral grooves 6 formed therein, and the member 5 is adjustable along the operating-shaft 12 toward and from the fixed member and is provided with tongues 8, seated and moving within the grooves 6 and adapted, upon the adjustment of the member, to vary the size of the seed-cells. The member 4 of the seed-disk has its rear face, or that which abuts against the fixed plate 2, cored out and seated upon a flange 9, projecting horizontally from the plate 2. This flange, lying within the member, constitutes the bottom of the seed-cells, and the plate 2 constitutes one of the end walls of the same, while their other end wall is formed by the ends of the tongues 8. The ends of the tongues 8 are slightly concaved, as at 10, which when the member 5 is moved inward until the ends of the tongues abut against the fixed plate form very small cells for the accommodation of very minute seeds.

11 is a star-wheel mounted upon the operating-shaft 12 and adapted to be adjusted back and forth along the same and held in its various positions by a screw 13, for the purpose to be presently explained.

14 is a driving-disk fixed on an axle-shaft of the machine and operated by the ground-wheels 15. This disk has its inner face provided with a plurality of concentric rows of teeth 16. The teeth in each row are equidistant apart; but the teeth in each row are differently spaced from the teeth in the remaining rows. For example, we have shown the disk as provided with four rows of teeth, with the intervals of space between the teeth in the outer row comparatively short, those in the next row longer, and so on until those of the inner row are comparatively long for the purpose to be presently set forth. The teeth on the driving-disk 14 are adapted to engage the star-wheel 11 and operate the same to impart a step-by-step rotary motion to the operating-shaft and seed-disk carried thereby, and in order to increase or diminish this motion to vary the rate of discharge of the seed it is but necessary to move the star-wheel 11 along the shaft 12 to engage with any desired row of teeth upon the driving-disk 14. It is obvious that if the star-wheel is moved to a position to be engaged and operated by the outer row of teeth the seed will be discharged with greater frequency, and consequently the distance between the hills will be shorter, whereas if operated by the inner row of teeth the discharge of seed will occur at considerably longer intervals and the distance between the hills will be accordingly increased.

It is to be understood that while we have shown the driving-disk as provided with four rows of teeth this number may be varied as circumstances may require; nor do we limit ourselves to the other details of construction herein shown and described, as such changes as may suggest themselves to the skilled mechanic to meet certain exigencies of operation may be made without departing from the spirit or scope of our invention.

Having thus described our invention, what we claim is—

1. In a seed-planter, the combination with a seed-hopper, of a relatively fixed plate carried thereby, a rotary seed-disk mounted beneath the hopper and abutting against said plate, said disk comprising two relatively adjustable members, one provided in its periphery with transverse grooves, constituting seed-cells and the other with tongues seated in the said grooves and adapted, upon the adjustment of the members toward and from each other, to vary the size of the seed-cells.

2. In a seed-planter, the combination with a seed-hopper, of a fixed plate carried thereby, a horizontally-projecting flange carried by the plate, a rotary seed-disk comprising two relatively adjustable members, mounted beneath the disk with its inner member seated upon said flange and provided with transverse peripheral grooves constituting seed-cells closed at their bottoms by the flange and at their inner ends by the fixed plate, the outer member provided with tongues seated in said grooves and adapted, upon the adjustment of the members toward and from each other, to vary the size of the seed-cells.

In testimony whereof we affix our signatures in presence of two witnesses.

WILLIAM H. SANDIFER.
NOAH E. MEREDITH.

Witnesses:
ED M. HAINES,
W. A. BARR.